United States Patent
Borland

(10) Patent No.: US 6,357,226 B2
(45) Date of Patent: *Mar. 19, 2002

(54) CONTROL SYSTEM FOR LEAN AIR-FUEL RATIO $NO_x$ CATALYST SYSTEM

(75) Inventor: Mark Borland, Troy, MI (US)

(73) Assignee: Chrysler Corporation, Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,314

(22) Filed: Oct. 22, 1998

(51) Int. Cl.⁷ .................................................. F01H 3/00
(52) U.S. Cl. .............................. 60/298; 60/286; 60/295; 60/300; 60/303
(58) Field of Search .......................... 60/274, 284, 285, 60/300, 301, 303, 286, 276, 298; 423/212

(56) References Cited

U.S. PATENT DOCUMENTS

| | | | |
|---|---|---|---|
| 3,723,070 A | * 3/1973 | Houdry | 60/300 |
| 4,821,701 A | 4/1989 | Nankee, II et al. | |
| 5,201,802 A | * 4/1993 | Hirota et al. | 60/300 |
| 5,255,661 A | 10/1993 | Nankee, II et al. | |
| 5,357,752 A | * 10/1994 | Lucchesi | 60/300 |
| 5,400,762 A | 3/1995 | Fodale et al. | |
| 5,404,719 A | 4/1995 | Araki et al. | |
| 5,426,934 A | * 6/1995 | Hunt et al. | 60/276 |
| 5,520,162 A | 5/1996 | Rotramel et al. | |
| 5,524,432 A | * 6/1996 | Hansel | 60/301 |
| 5,643,536 A | * 7/1997 | Schmelz | 60/286 |
| 5,645,745 A | 7/1997 | Hartwick et al. | |
| 5,682,869 A | 11/1997 | Nankee, II et al. | |
| 5,809,774 A | * 9/1998 | Peter-Hoblyn et al. | 60/286 |
| 5,815,828 A | 9/1998 | Nankee, II et al. | |
| 5,842,341 A | * 12/1998 | Kibe | 60/286 |
| 5,845,487 A | * 12/1998 | Fraenkle et al. | 60/286 |
| 5,950,422 A | * 9/1999 | Dölling | 60/286 |
| 5,983,628 A | * 11/1999 | Borroni-Bird et al. | 60/286 |
| 6,001,318 A | * 12/1999 | Tillaart et al. | 423/212 |
| 6,018,943 A | * 2/2000 | Martin et al. | 60/301 |
| 6,029,443 A | * 2/2000 | Hirota et al. | 60/298 |
| 6,082,102 A | * 7/2000 | Wissler et al. | 60/286 |
| 6,119,448 A | * 9/2000 | Emmerling et al. | 60/286 |

FOREIGN PATENT DOCUMENTS

| | | | |
|---|---|---|---|
| DE | 2233793 | * | 1/1974 |
| JP | 1-15421 | * | 1/1989 |
| JP | 5-340237 | * | 12/1993 |
| JP | 6-248936 | * | 9/1994 |

* cited by examiner

Primary Examiner—Thomas Denion
Assistant Examiner—Tu M. Nguyen
(74) Attorney, Agent, or Firm—Edwin W. Bacon, Jr.

(57) ABSTRACT

A control system is described for optimizing the reduction of nitrogen oxides in exhaust gas produced by an internal combustion engine, especially those internal combustion engines that employ a lean air-fuel ratio. The control system employs a temperature control assembly that is capable of selectively heating the exhaust gas prior to introduction into the $NO_x$ catalyst system, thus rapidly bringing the temperature of the $NO_x$ catalyst system up to operating temperature.

10 Claims, 2 Drawing Sheets

CONTROL SYSTEM FOR LEAN AIR-FUEL RATIO $NO_x$ CATALYST SYSTEM

BACKGROUND OF THE INVENTION

1. Field of the Invention

The present invention relates generally to an emissions reduction system employed in an exhaust passage of an internal combustion engine, and more particularly to a control system for optimizing the reduction of nitrogen oxides in exhaust gas produced by an internal combustion engine employing a lean air-fuel ratio.

2. Background and Summary of the Invention

Increasingly stringent government regulations for the allowable emission levels of carbon monoxide (CO), hydrocarbons (HC), and nitrogen oxides ($NO_x$) have resulted in the use of catalytic converters on most passenger vehicles sold in the United States. The task of the catalytic converter is to promote chemical reactions for the conversion of these pollutants to carbon dioxide, water, and nitrogen.

For automotive exhaust applications, the pollutant removal reactions are the oxidation of carbon monoxide and hydrocarbons and the reduction of nitrogen oxides.

Converters are of two basic catalyst types: the two-way converter (oxidation) and the three-way converter (oxidation and reduction). Both types typically employ either a pellet or monolith design.

The two-way catalytic converter is placed in the exhaust system between the exhaust manifold and muffler. When the hot gases are forced through the converter, they contact the catalyst-coated pellets or honeycomb, depending on the type. The resulting exothermic reaction cataylzed by the catalyst causes a rapid increase in the exhaust temperature. This, in turn, causes the carbon monoxide and hydrocarbons to change (by means of an oxidizing process) into water ($H_2O$) vapor and carbon dioxide ($CO_2$) gas. The two-way oxidizing converter does not reduce the nitrogen oxides ($NO_x$).

The three-way converter uses an additional catalyst bed typically coated with platinum, palladium, rhodium, and combinations thereof. The three-way converter is capable of removing all three pollutants (i.e., carbon monoxide, hydrocarbons, and nitrogen oxides) simultaneously, provided that the catalyst is maintained in a chemically correct environment that is neither overly oxidizing or reducing.

Although catalytic converters work well with engines employing a stoichiometric air-fuel ratio (i.e., 14.7:1), they are not as effective with engines employing a lean air-fuel ratio (i.e., 16.0:1 or higher). Examples of engines exhibiting lean burn operation are diesel and certain newer generation gasoline engines (e.g., direct injection gasoline engines).

A type of catalyst for removing $NO_x$ from the exhaust gas of internal combustion engines during lean burn operation, often called a "$NO_x$ trap" or "$NO_x$ absorber," is disclosed in U.S. Pat. No. 5,404,719 issued Apr. 11, 1995. This catalyst generally comprises alkaline metals or alkaline earth materials like potassium or strontium in combination with a precious metal like platinum. Under conditions of excess oxygen, i.e., when the exhaust gas is lean, this trap is capable of storing/absorbing, nitrogen oxides. When the oxygen concentration of the exhaust gas is lowered, the $NO_x$ is released from the $NO_x$ trap catalyst. These traps thus operate in a different way compared to conventional lean-burn catalysts. More particularly, the widely held mechanism for $NO_x$ trap operation is that the precious metal first oxidizes NO to $NO_2$ and the $NO_2$ subsequently forms a nitrate complex with the alkaline material. In a stoichiometric or rich environment, the nitrate is thermodynamically unstable, and the stored $NO_x$ is released. $NO_x$ then catalytically reacts with excess reducing species in the exhaust gas to form $N_2$.

Another catalyst system for removing $NO_x$ from exhaust gases of lean burn internal combustion engines is referred to as the Selective Catalytic Reduction (SCR) system. The SCR catalyst system uses an additive, such as urea, which is introduced into the exhaust stream wherein it combines with the $NO_x$ over a suitable catalyst to eliminate the $NO_x$ from the tailpipe emissions. Urea decomposes in the heat of the exhaust stream into ammonia which reacts with the $NO_x$. Ammonia itself could be introduced but is much more dangerous to have onboard the vehicle. The reaction between the ammonia and the $NO_x$ over the catalyst is highly temperature dependent. If too much urea is metered into the exhaust system and there is either insufficient $NO_x$ in the exhaust stream or the catalyst temperature is too low to promote efficient conversion, then ammonia gas will exit the tailpipe as a dangerous and foul smelling gas. Therefore, the proper control of the quantity of urea injected is very important as well as the temperature of the $NO_x$ catalyst system.

One catalyst system that utilizes a SCR system is marketed under the tradename SINOX™ by Siemens Automotive Corporation (Auburn Hills, Mich.). The SINOX™ system's electronic control system processes temperature and emission level information fed from sensors, and then meters and injects appropriate amounts of urea into the catalyst system. A reduction of the $NO_x$ levels of up to 70% is claimed by the manufacturer.

However, the aforementioned methods of removing $NO_x$ from the exhaust gas of a lean burn internal combustion engine have failed to achieve an optimal level of $NO_x$ reduction. In particular, previous methods have not achieved the proper control and maintenance of the temperature of the $NO_x$ catalyst system within an optimal temperature range. Accordingly, the level of $NO_x$ exiting the tailpipe is relatively high when the automobile is initially started and the $NO_x$ catalyst system is relatively cool. The level of $NO_x$ exiting the tailpipe decreases gradually as the $NO_x$ catalyst system warms up to operating temperatures, thus becoming more efficient. However, in the interim, unnecessarily high amounts of $NO_x$ have exited the tailpipe into the atmosphere, thus contributing to pollution concerns.

Therefore, there exists a need for a control system for optimizing the removal of nitrogen oxides from the exhaust gas of a lean burn internal combustion engine.

In accordance with one aspect of the present invention, a control system for use in an internal combustion engine automobile having a $NO_x$ catalyst system, comprises a temperature control assembly placed upstream of the $NO_x$ catalyst system, the temperature control assembly selectively adjusting the temperature of the exhaust gas prior to the exhaust gas being introduced into the $NO_x$ catalyst system.

In accordance with another aspect of the present invention, a control system for use in an internal combustion engine automobile having a $NO_x$ catalyst system, comprises a temperature control assembly placed upstream of the $NO_x$ catalyst system, the temperature control assembly selectively adjusting the temperature of the exhaust gas prior to the exhaust gas being introduced into the $NO_x$ catalyst system. A temperature sensor is placed downstream of the temperature control assembly and upstream of the $NO_x$ catalyst system, the first temperature sensor detecting the temperature of the exhaust gas prior to introduction into the $NO_x$ catalyst system.

In accordance with yet another aspect of the present invention, a control system for use in an internal combustion engine automobile having a $NO_x$ catalyst system, comprises a temperature control assembly placed upstream of the $NO_x$ catalyst system, the temperature control assembly selectively adjusting the temperature of the exhaust gas prior to the exhaust gas being introduced into the $NO_x$ catalyst system. A $NO_x$ sensor is placed downstream of the temperature control assembly and upstream of the $NO_x$ catalyst system, the $NO_x$ sensor sensing the level of $NO_x$ in the exhaust gas. A first temperature sensor is placed downstream of the temperature control assembly and upstream of the $NO_x$ catalyst system, the first temperature sensor detecting the temperature of the exhaust gas prior to introduction into the $NO_x$ catalyst system. A second temperature sensor is placed downstream of the $NO_x$ catalyst system, the second temperature sensor detecting the temperature of the exhaust gas after exiting the $NO_x$ catalyst system.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

Because the catalytic efficiency of the $NO_x$ catalyst system is highly temperature dependent, and diesel exhaust gases are relatively cool, the addition of a control system upstream of the $NO_x$ catalyst system is proposed to bring the $NO_x$ catalyst system up to operating, and preferably optimal, temperature as quickly as possible. In this manner, the quantity of $NO_x$ in the exhaust gas exiting the tailpipe will be reduced to a greater extent than with previous methods.

Figure 1:
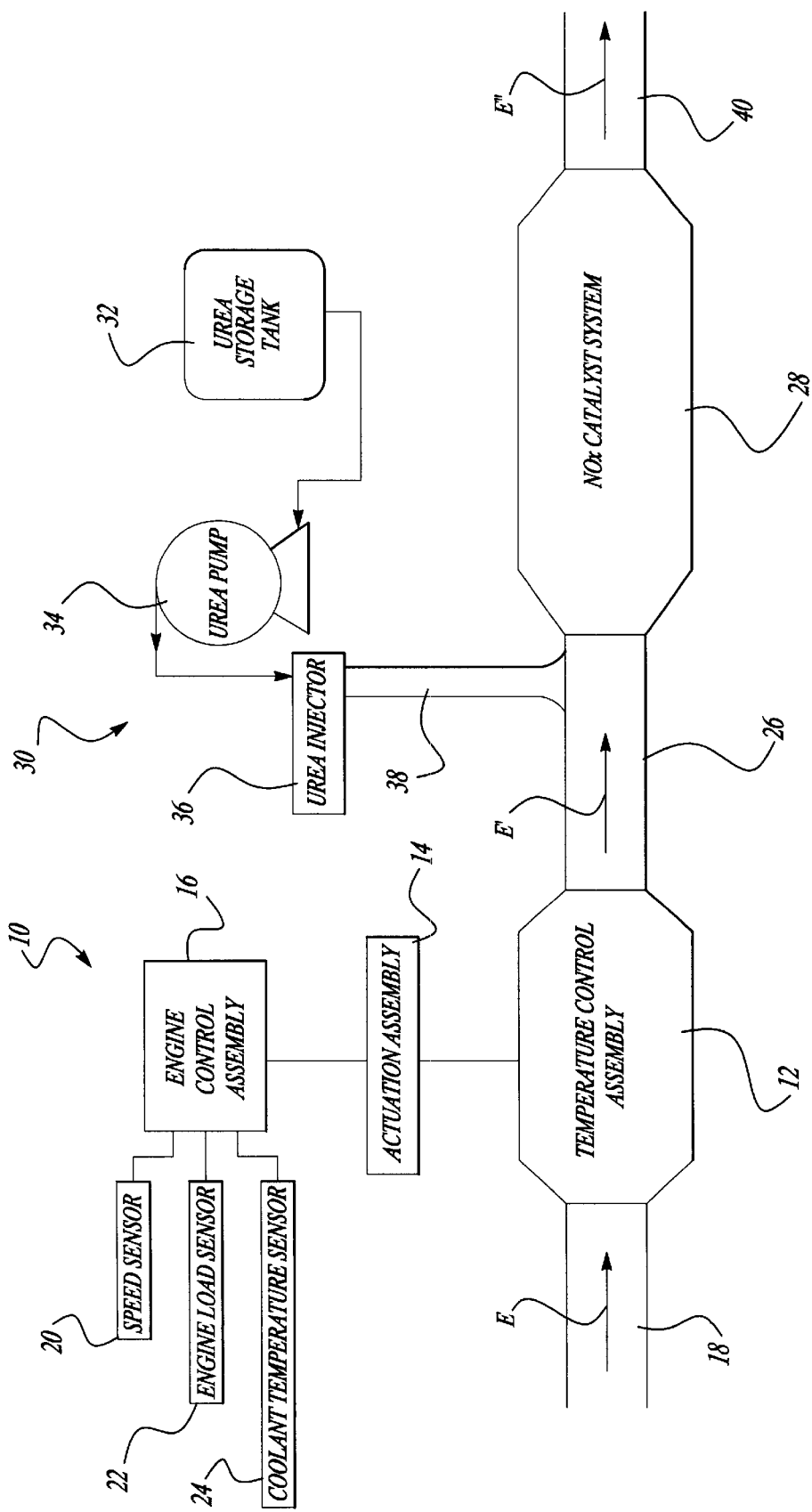
FIG. 1 is a schematic view of a control system for optimizing the reduction of nitrogen oxides in exhaust gas produced by an internal combustion engine, in accordance with one embodiment of the present invention.

With reference to FIG. 1, there is generally shown a control system 10 for optimizing the reduction of nitrogen oxides in exhaust gas produced by an internal combustion engine, in accordance with one embodiment of the present invention. The control system 10 is intended to be employed with catalytic converters having a $NO_x$ catalyst system, especially a lean $NO_x$ catalyst system. The control system 10 can be placed immediately downstream of the vehicle's exhaust manifold, or alternatively, immediately downstream of the vehicle's conventional catalytic converter system.

The control system 10 is comprised primarily of a temperature control assembly 12, an actuation assembly 14, and an engine control assembly 16.

The intended purpose of the temperature control assembly 12 is to selectively heat the exhaust gas E emitted or expelled from the exhaust manifold 18 in order to raise the temperature of the exhaust gas E. The heating of the exhaust gas E is preferably accomplished by disposing at least one heating element (not shown) within the temperature control assembly 12. The heating element is preferably comprised of a heat conducting material, such as, but not limited to metal. The heating element is preferably heated by the use of electrical power. Thus, when the exhaust gas E flows past the heating element, the temperature of the exhaust gas E may be raised rapidly.

Under certain circumstances, it may not be necessary to raise the temperature of the exhaust gas E. In this case, it is preferable to be able to control the flow of electrical power to the heating element of the temperature control assembly 12, so that the heating element is not constantly receiving electrical power and potentially overheating and causing a fire. Thus, an actuation assembly 14, such as, but not limited to a switch, circuit breaker, or like device is employed. The actuation assembly 14 is preferably in electrical communication with the temperature control assembly 12. The actuation assembly 14 is capable of selectively permitting electrical power to flow to the heating element of the temperature control assembly 12.

In order to control the activity of the actuation assembly 14, an engine control assembly 16, such as, but not limited to an engine controller module, computer, microprocessor, or like device may be employed. The engine control assembly 16 is preferably in electrical communication with the actuation assembly 14. By way of a nonlimiting example, the engine control assembly 16 may receive data input from various sensors or monitors indicating that the temperature of the exhaust gas E needs to be raised, for example when the automobile's engine is initially started. These sensors could detect data from various vehicle performance parameters. By way of a nonlimiting example, a vehicle speed sensor 20, an engine load sensor 22, and a coolant temperature sensor 24 may be employed to provide data to the engine control assembly 16. If the data indicates that the temperature of the exhaust gas E needs to be raised, the engine control assembly 16 causes the actuation assembly 14 to permit electrical power to flow to the heating element of the temperature control assembly 12. Conversely, if the data indicates that the temperature of the exhaust gas E does not need to be raised, the engine control assembly 16 causes the actuation assembly 14 to restrict the flow of electrical power to the heating element of the temperature control assembly 12. In this manner, the temperature of the exhaust gas E may be carefully controlled.

Once the heated exhaust gas E' has passed through the temperature control assembly 12, it is then introduced into a passageway 26 disposed between the temperature control assembly 12 and a $NO_x$ catalyst system 28. Prior to the exhaust gas E' being introduced into the $NO_x$ catalyst system 28, a metered amount of urea is selectively introduced into the passageway 26 by a urea injection system 30. The urea injection system 30 is preferably in communication with the control system 10 so as to optimize the efficiency of the urea injection process. The urea injection system 30 is primarily comprised of a urea storage tank 32, a urea pump 34, a urea injector 36, and a passageway 38 in fluid communication with passageway 26. The urea and the exhaust gas E' come into contact with one another in passageway 26; however, there is very little chemical interaction occurring between the two substances at this point.

The urea/exhaust gas E' mixture is then introduced into the $NO_x$ catalyst system 28, whereupon the catalyst acts to convert the $NO_x$ into nitrogen. As previously noted, it is important that the $NO_x$ catalyst system 28 operate within a certain temperature range in order to efficiently convert the $NO_x$ into nitrogen. Accordingly, the use of heated exhaust gas ensures that the temperature of the $NO_x$ catalyst system 28 will rapidly rise to operational levels even if the vehicle's engine is relatively cold.

Finally, the treated exhaust gas E" exits the tailpipe 40 having had its $NO_x$ levels reduced on the order of 90–95% compared to the levels present in the exhaust gas E emitted from the exhaust manifold 18. Thus, the present invention achieves a significant reduction in the levels of $NO_x$ when compared to previous methods.

Figure 2:
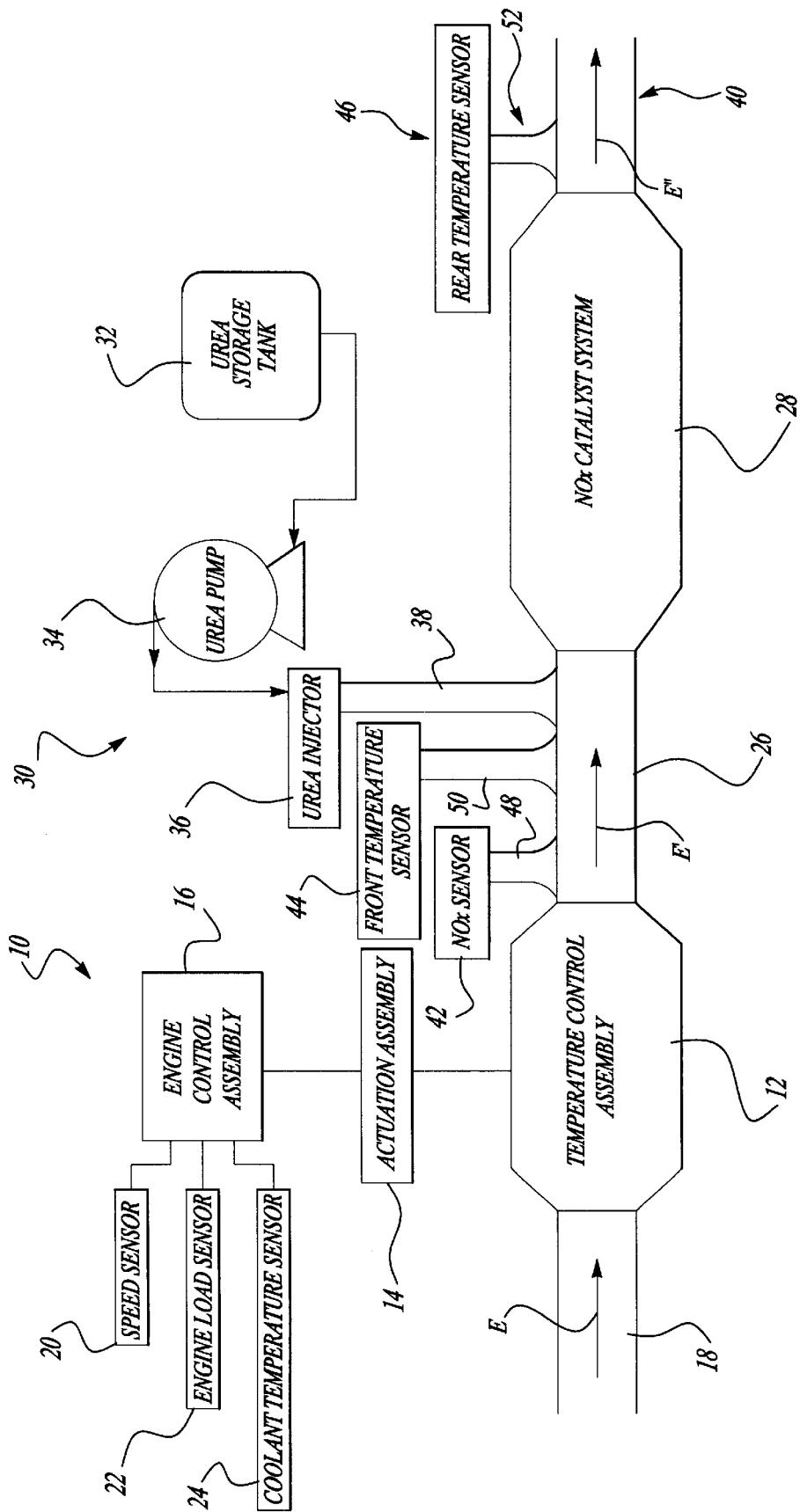
FIG. 2 is a schematic view of a control system for optimizing the reduction of nitrogen oxides in exhaust gas produced by an internal combustion engine, in accordance with an alternative embodiment of the present invention.

With reference to FIG. 2, there is generally shown a control system 10 for optimizing the reduction of nitrogen oxides in exhaust gas produced by an internal combustion engine, in accordance with an alternative embodiment of the present invention. The control system 10 is generally similar to the one illustrated in FIG. 1; however, a $NO_x$ sensor 42, a front temperature sensor 44, and a rear temperature sensor 46 have been added to enhance the efficiency of the control system 10. It should be noted that all three of the aforementioned components are optional and may be employed alone or in any number of combinations with one another. Additionally, it should be noted that the positions of the $NO_x$ sensor 42 and the front temperature sensor 44 with respect to one another is for illustrative purposes only.

The amount of urea injected into passageway 26 is a function of the level of $NO_x$ in the exhaust gas emitted from the exhaust manifold, specifically exhaust gas E'. Because the control of the quantity of urea injected is important to prevent ammonia from exiting the tailpipe 40, a $NO_x$ sensor 42 is employed for determining the quantity of $NO_x$ in the exhaust gas E'.

Preferably, the $NO_x$ sensor 42 is in communication with passageway 26 via passageway 48. Additionally, the $NO_x$ sensor 42 is preferably in communication with the control system 10 so as to be able to provide real-time feedback to the engine control assembly 16 as to the amount of $NO_x$ in the exhaust gas E'. This may be accomplished through mapping of the quantity of $NO_x$ generated by the engine on a dynamometer.

Preferably, the front temperature sensor 44 is in communication with passageway 26 via passageway 50. Additionally, the front temperature sensor 44 is preferably in communication with the control system 10 so as to be able to provide real-time feedback to the engine control assembly 16 as to the temperature of the exhaust gas E. This is accomplished by measuring the temperature drop or gain that occurs when the exhaust gas E passes through the temperature control assembly 12. In this manner, the temperature of the exhaust gas E can be controlled to a much greater degree.

By way of a non-limiting example, the engine control assembly 16 may receive data input from the front temperature sensor 44 indicating that the temperature of the exhaust gas E needs to be raised. Accordingly, the engine control assembly 16 causes the actuation assembly 14 to permit the flow of electrical power to the heating element of the temperature control assembly 12. Conversely, if the front temperature sensor 44 indicates that the temperature of the exhaust gas E does not need to be raised, or in fact lowered, the engine control assembly 16 causes the actuation assembly 14 to restrict the flow of electrical power to the heating element of the temperature control assembly 12.

Preferably, the rear temperature sensor 46 is in communication with passageway 26 via passageway 52. Additionally, the rear temperature sensor 46 is preferably in communication with the control system 10 so as to be able to provide real-time feedback to the engine control assembly 16 as to the temperature of the $NO_x$ catalyst system 28. This is accomplished by measuring the temperature drop or gain that occurs when the exhaust gas E' passes through the $NO_x$ catalyst system 28. Accordingly, if the temperature of the $NO_x$ catalyst system 28 needs to be raised, the engine control assembly 16 causes the actuation assembly 14 to permit the flow of electrical power to the heating element of the temperature control assembly 12. Conversely, if the rear temperature sensor 44 indicates that the temperature of the $NO_x$ catalyst system 28 does not need to be raised, or in fact lowered, the engine control assembly 16 causes the actuation assembly 14 to restrict the flow of electrical power to the heating element of the temperature control assembly 12. In this manner, the temperature of the $NO_x$ catalyst system 28 can be controlled to a great degree.

Preferably the control system 10, the $NO_x$ sensor 42, the front temperature sensor 44, the rear temperature sensor 46, the urea injection system 30, and the $NO_x$ catalyst system 28 are in simultaneous communication with each other to enhance the efficient removal of $NO_x$ from the exhaust gas produced by the engine.

In practice, the $NO_x$ level in the exhaust gas E (detected by the $NO_x$ sensor 42) is then used with the temperature of the $NO_x$ catalyst system 28 (detected by the rear temperature sensor 46) to determine the precise amount of urea required to be introduced into passageway 26.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for use in an internal combustion engine automobile having a $NO_x$ catalyst system and a urea injection system, comprising: a first temperature sensor placed upstream of the $NO_x$ catalyst system, the first temperature sensor detecting the temperature of the exhaust gas prior to introduction into the $NO_x$ catalyst system;

a $NO_x$ sensor placed upstream of the $NO_x$ catalyst system, the $NO_x$ sensor sensing the level of $NO_x$ in the exhaust gas;

a temperature control assembly upstream of the first temperature sensor and $NO_x$ sensor, the temperature control assembly selectively adjusting the temperature of the exhaust gas prior to the exhaust gas being introduced into the $NO_x$ catalyst system; and a second temperature sensor placed downstream of the $NO_x$ catalyst system, the second temperature sensor detecting the temperature of the exhaust gas after exiting the $NO_x$ catalyst system, wherein the $NO_x$ sensor, the second temperature sensor, and the urea injection system are in communication to enhance the removal of $NO_x$ from the exhaust gas.

2. The control system of claim 1, further comprising an actuation assembly being capable of selectively actuating the temperature control assembly.

3. The control system of claim 2, further comprising an engine control assembly being capable of selectively supplying electrical power to the actuation assembly.

4. The control system of claim 3, wherein the engine control assembly selectively supplies electrical power to the actuation assembly in response to at least one of the parameters selected from the group consisting of automobile speed, engine load, coolant temperature, and combinations thereof.

5. A control system for use in an internal combustion engine automobile having a $NO_x$ catalyst system, comprising:

a temperature control assembly placed upstream of the $NO_x$ catalyst system, the temperature control assembly selectively adjusting the temperature of the exhaust gas prior to the exhaust gas being introduced into the $NO_x$ catalyst system;

a first temperature sensor placed downstream of the temperature control assembly and upstream of the $NO_x$ catalyst system, the first temperature sensor detecting the temperature of the exhaust gas prior to introduction into the $NO_x$ catalyst system;

a $NO_x$ sensor placed downstream of the temperature control assembly and upstream of the $NO_x$ catalyst system, the $NO_x$ sensor sensing the level of $NO_x$ in the exhaust gas; and a second temperature sensor placed downstream of the $NO_x$ catalyst system, the second temperature sensor detecting the temperature of the exhaust gas after exiting the $NO_x$ catalyst system;

wherein the temperature control assembly raises the temperature of the exhaust gas prior to the exhaust gas being introduced into the $NO_x$ catalyst system.

6. The control system of claim 5, wherein the temperature control assembly comprises at least one heating element.

7. The control system of claim 5, further comprising an actuation assembly being capable of selectively actuating the temperature control assembly.

8. The control system of claim 7, further comprising an engine control assembly being capable of selectively supplying electrical power to the actuation assembly.

9. The control system of claim 8, wherein the engine control assembly selectively supplies electrical power to the actuation assembly in response to at least one sensor selected from the group consisting of the first temperature sensor, the $NO_x$ sensor, the second temperature sensor, and combinations thereof.

10. A control system for use in an internal combustion engine automobile having a $NO_x$ catalyst system, comprising:

a temperature control assembly placed upstream of the $NO_x$ catalyst system, the temperature control assembly selectively adjusting the temperature of the exhaust gas prior to the exhaust gas being introduced into the $NO_x$ catalyst system;

a $NO_x$ sensor placed downstream of the temperature control assembly and upstream of the $NO_x$ catalyst system, the $NO_x$ sensor sensing the level of $NO_x$ in the exhaust gas;

a first temperature sensor placed downstream of the temperature control assembly and upstream of the $NO_x$ catalyst system, the first temperature sensor detecting the temperature of the exhaust gas prior to introduction into the $NO_x$ catalyst system;

a second temperature sensor placed downstream of the $NO_x$ catalyst system, the second temperature sensor detecting the temperature of the exhaust gas after exiting the $NO_x$ catalyst system;

an actuation assembly being capable of selectively actuating the temperature control assembly; and an engine control assembly being capable of selectively supplying electrical power to the actuation assembly;

wherein the engine control assembly selectively supplies electrical power to the actuation assembly in response to at least one sensor selected from the group consisting of the first temperature sensor, the $NO_x$ sensor, the second temperature sensor, and combinations thereof;

wherein the temperature control assembly raises the temperature of the exhaust gas prior to the exhaust gas being introduced into the $NO_x$ catalyst system.

* * * * *